Aug. 16, 1938.   D. R. McNEAL   2,127,129
LUBRICATION EQUIPMENT AND METHOD OF VENTING THE SAME
Filed Sept. 2, 1936   2 Sheets-Sheet 1
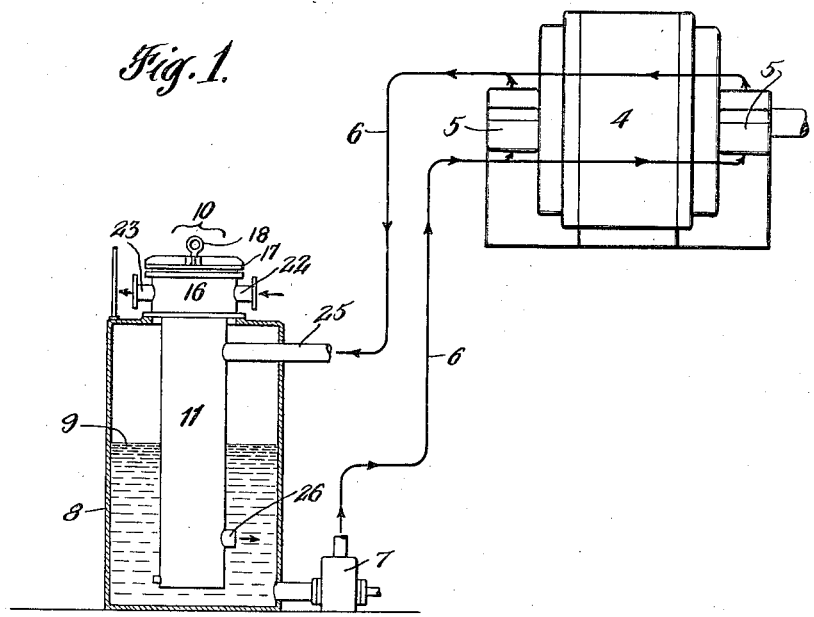
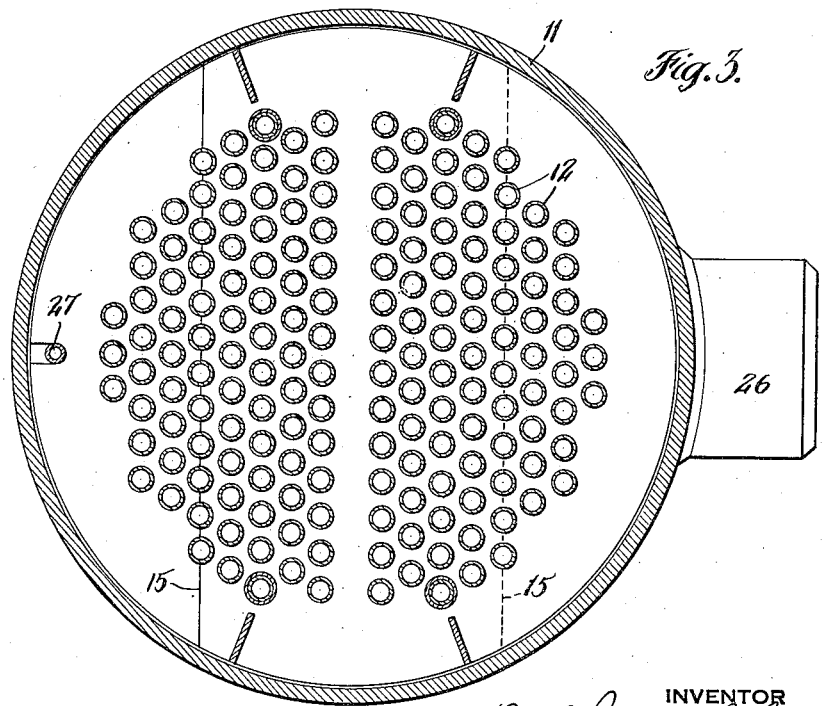
INVENTOR
Daniel Raymond McNeal
BY
ATTORNEYS

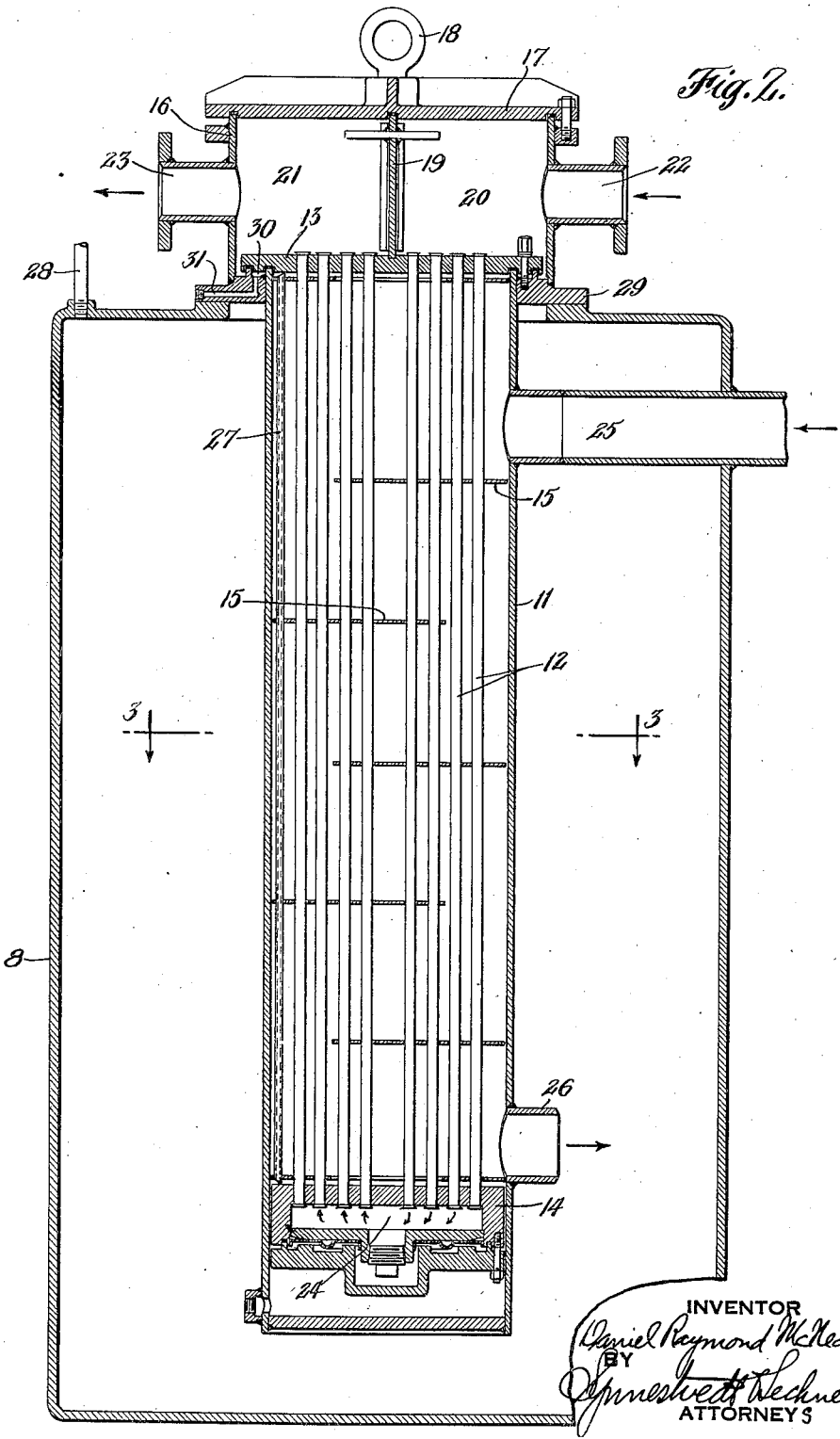

Patented Aug. 16, 1938

2,127,129

UNITED STATES PATENT OFFICE 2,127,129

LUBRICATION EQUIPMENT AND METHOD OF VENTING THE SAME

Daniel Raymond McNeal, Abington, Pa., assignor to Andale Company, Philadelphia, Pa., a corporation of Pennsylvania Application September 2, 1936, Serial No. 99,042

5 Claims. (Cl. 257—224)

This invention relates primarily to lubrication equipment and especially to equipment of this kind which includes a heat exchanger for cooling the oil, as well as to a means for and a method of venting the cooler. However, the improved heat exchanger and the method of venting disclosed herein are applicable to similar equipment which may be used for other equivalent purposes.

The invention is particularly useful in connection with lubrication systems in which is employed an oil cooler of the so-called tube and shell type, i. e., one in which a bundle of tubes is placed within a casing or shell with suitable headers, baffles and circulation connections whereby a cooling medium may be employed in heat exchange relation with the oil to be cooled.

Equipment of the character described has sometimes given trouble in service and in some instances explosions have occurred which have resulted in the issuance of orders of public service commissions which require the oil coolers to be submerged or placed in an oil reservoir in order to avoid risk of injury to workmen in the event that an explosion occurs. This requirement has introduced a number of problems insofar as proper venting of the coolers is concerned.

With the foregoing in mind, the principal object of the invention can be better understood and it may be said to reside in the provision of equipment of the character described having improved means for venting the gases and vapors which accumulate in the cooler as well as in the provision of an improved method for effecting such venting.

Another object of the invention is to prolong the life of equipment of the character described as well as to insure greater safety.

I have developed my invention in connection with a system for lubricating the bearings of a turbine and the present disclosure, therefore, will be directly related to this use although it will be obvious to those skilled in the art that the essential features of the invention might very well be employed in similar equipment for other equivalent purposes.

In the drawings:—

Figure 1 is a diagrammatic illustration (not strictly to scale) of the invention as applied to a lubrication system for turbine bearings;

Figure 2 is a vertical section through the heat exchanger for cooling the oil; and Figure 3 is a section on an enlarged scale taken approximately as indicated by the line 3—3 in Figure 2.

The drawings illustrate a turbine 4 having bearings 5 which are lubricated by a circulating system involving suitable conduits 6 diagrammatically illustrated with suitable arrows in order to show the direction of circulation. The oil is drawn by a pump 7 from the lower portion of a chamber or reservoir 8 which is partially filled with oil to a level indicated at 9.

Through the upper wall of the chamber 8 projects an oil cooler 10 which is preferably of the tube and shell type. The details of this cooler are illustrated in Figures 2 and 3, from inspection of which it will be seen that it comprises a shell 11 in which is fitted a bundle of tubes 12, the upper ends of which are secured to the tube plate 13 and the lower ends of which to the tube plate 14; a series of baffles 15; and a header 16 closed by a cover 17 which latter may be provided with an eye 18 for convenience in lifting the cooler.

The interior of the header 16 is divided by means of a baffle 19 into an inlet chamber 20 and an outlet chamber 21 for the cooling medium, preferably water, which comes in through the pipe connection 22 and then passes outwardly through the pipe connection 23 after travelling through the interior of the tubes 12, the arrangement of the tubes being such as to cause the water to pass first downwardly through those tubes located at the right-hand side and then upwardly through the remaining tubes which are located at the left-hand side as will be clearly apparent from Figures 2 and 3. The cooler, therefore, is of the two-pass type insofar as the tubes are concerned, there being provided at the lower end of the cooler a suitable header 24 for connecting the downcoming tubes to the upgoing tubes.

As is now apparent, my improved cooler is arranged so that the oil to be cooled is on the outside of the tubes, the casing or shell 11 being provided with an oil inlet 25 which comes in through the wall of the reservoir 8. The baffles 15 provide for a tortuous flow of the oil back and forth across the tubes to the point of discharge at the outlet 26, the discharge being directly into the chamber of the reservoir as shown.

As the oil passes downwardly through the shell 11 there is a drop in pressure between the point of inlet and the point of outlet because of the effect of the baffling and also because of the viscous nature of the oil. I utilize this drop in pressure to continually purge the space or region directly below the upper tube sheet and thereby keep it entirely free of accumulations of gases or vapors. In the structure shown this is accomplished by providing a vent tube or conduit 27 which extends from a point just below the under face of the tube sheet 13 to a point just above the upper face of the tube sheet 14. The ends of this tube are cut at an angle, as shown in Figure 2 so as to facilitate the flow therethrough and avoid stoppage.

It will be seen, therefore, that I have provided what might be termed a by-pass or means for constantly circulating a portion of the oil together with any gases or vapors from the region of the upper or inlet end of the oil cooling space to the region of the lower or outlet end of the oil cooling space. The circulation downwardly through the tube 27 is caused, as stated, by the drop in pressure between the two ends of the shell 11. After the gases reach the reservoir 8 they are free to rise to the top of the oil and discharge through the vent 28 which may be extended to some remote point where there will be no danger of explosion.

It will be noted that at its upper end the shell 11 is provided with an annular flange portion 29 to which is secured the tube plate 13, there being provided a groove 30 around the upper end of the shell 11. This groove 30 is connected by means of a tell-tale vent 31 to discharge to the outside of the reservoir or into the vent 28 as may be desired.

By preventing the accumulation of gases or vapors under the upper tube sheet 13, my invention markedly increases the life of the equipment for the reason that any accumulations of this kind, however slight, make possible a rather serious degree of corrosion on the tubes just at the point where they enter the tube sheet, which corrosion is specially troublesome if the temperature is at all high as is nearly always the case in equipment of this kind.

What I claim is:

1. The method of venting accumulated gases or vapors from the shell space of a tube and shell type heat exchanger, which method consists in flowing the fluid in the shell space subject to constriction in a direction away from the place of accumulation and utilizing the drop in pressure between the region of the fluid inlet and the region of the fluid outlet to flow the gases or vapors under less constriction from the place of accumulation and discharge them into the circulating fluid in the region of said fluid outlet.

2. A heat exchanger comprising in combination an upright shell having a fluid inlet in its upper region, a fluid outlet in its lower region, means for constricting flow from the inlet to the outlet, an upper end wall, and a conduit open to the shell space at a point just below said end wall and extending therefrom to a point in the region of said outlet, the conduit also being open at the region last mentioned.

3. A heat exchanger comprising in combination, a shell having an inlet at one end and an outlet at the other end, means for constricting flow from the inlet to the outlet, a tube sheet at each end of the shell, tubes extending between said sheets, and a venting conduit extending from a point adjacent the inner face of the tube sheet at the entrance end of the shell space to a point in the region of the inner face of the other tube sheet at the exit end of the shell space.

4. Lubrication equipment comprising in combination an oil reservoir chamber, an oil cooler casing housed in said reservoir chamber, an oil inlet to said casing near the upper end thereof, an oil outlet from said casing discharging from a point near the bottom thereof into said reservoir chamber, baffle means in the casing between the inlet and the outlet, a venting conduit extending from a point in the casing just below the upper end wall thereof to a point in the region of said outlet, and a vent on said reservoir chamber.

5. Lubrication equipment comprising in combination with an oil reservoir, an oil cooler casing housed in said reservoir, a tube bundle having a header which defines the upper end of the cooling chamber, an oil inlet to said casing near the upper end thereof, an oil outlet from said casing discharging from a point near the bottom thereof into said reservoir, means for constricting flow from the inlet to the outlet, a venting conduit extending from a point in the casing just under the header to a point in the region of said outlet, and a vent on the reservoir.

DANIEL RAYMOND McNEAL.